United States Patent
Liu et al.

(10) Patent No.: US 7,808,893 B1
(45) Date of Patent: *Oct. 5, 2010

(54) SYSTEMS AND METHODS FOR PROVIDING REDUNDANCY IN COMMUNICATIONS NETWORKS

(75) Inventors: Changming Liu, Cupertino, CA (US);
Xiaosong Yang, Palo Alto, CA (US);
Lin Chen, San Jose, CA (US)

(73) Assignee: Juniper Networks, Inc., Sunnyvale, CA (US)

(*) Notice: Subject to any disclaimer, the term of this patent is extended or adjusted under 35 U.S.C. 154(b) by 1493 days.

This patent is subject to a terminal disclaimer.

(21) Appl. No.: 11/037,179

(22) Filed: Jan. 19, 2005

(51) Int. Cl.
*H04L 12/28* (2006.01)

(52) U.S. Cl. .................. 370/225; 370/248; 370/254; 370/354

(58) Field of Classification Search ........... 370/254, 370/225, 220, 228, 351, 355; 714/1–4, 41, 714/43, 45–46; 709/208, 239, 220
See application file for complete search history.

(56) References Cited

U.S. PATENT DOCUMENTS

| | | | |
|---|---|---|---|
| 6,732,186 B1* | 5/2004 | Hebert ........................ 709/239 |
| 6,954,436 B1* | 10/2005 | Yip et al. ..................... 370/254 |
| 7,010,716 B2* | 3/2006 | Yu et al. ........................ 714/4 |
| 7,328,261 B2* | 2/2008 | Husain et al. ................ 709/224 |

OTHER PUBLICATIONS

Hinden et al Request for Comments 3768 Virtual Router Redundacy Protocol, Apr. 2004.*
Cameron et. al. Configuring NetScreen Firewalls, 2004 ISBN:1932266399.*
Hinden, R., "Virtual Router Redundancy Protocol (VRRP)," Nokia Networking Group Memo, Apr. 2004, pp. 1-27.

* cited by examiner

*Primary Examiner*—Seema S Rao
*Assistant Examiner*—Henry Baron
(74) *Attorney, Agent, or Firm*—Harrity & Harrity, LLP

(57) ABSTRACT

A system includes a first network device and a second network device. The first network device includes a group of first logical portions and is configured to detect a problem with one of the first logical portions, and transmit a message identifying the one first logical portion. The second network device includes a group of second logical portions, where the group of second logical portions corresponds to the group of first logical portions. The second network device is configured to receive the message from the first network device, and activate the one second logical portion corresponding to the one first logical portion in response to receiving the message.

26 Claims, 7 Drawing Sheets

US 7,808,893 B1

SYSTEMS AND METHODS FOR PROVIDING REDUNDANCY IN COMMUNICATIONS NETWORKS

FIELD OF THE INVENTION

Implementations consistent with the principles of the invention relate generally to communications networks and, more particularly, to systems and methods for providing redundancy in communications networks.

BACKGROUND OF THE INVENTION

A typical communications network includes a lot of different types of network devices. For example, a typical communications network may include host devices, which act as the source or destination of a particular flow of traffic, routers and/or switches, which act to forward traffic flows toward their appropriate destinations, and security devices, which provide, for example, firewall or other security functionality. These different types of network devices may be interconnected via links.

In some instances, a link between a pair of network devices may fail or a network device may fail. In those instances, it is important that the communications network be able to continue to route traffic. Therefore, some networks include redundancy. For example, a second network device may act as a backup for a first network device. If any part of the first network device fails, the entire first network device may fail over to the second network device.

SUMMARY OF THE INVENTION

In a first implementation consistent with the principles of the invention, a method includes detecting a problem with a logical section of a first network device, and failing over only the logical section of the first network device to a second network device.

In another implementation consistent with the principles of the invention, a system includes a first network device and a second network device. The first network device includes a group of first logical portions and is configured to detect a problem with one of the first logical portions, and transmit a message identifying the one first logical portion. The second network device includes a group of second logical portions, where the group of second logical portions corresponds to the group of first logical portions. The second network device is configured to receive the message from the first network device, and activate the one second logical portion corresponding to the one first logical portion in response to receiving the message.

In still another implementation consistent with the principles of the invention, a network device includes a group of logical units, where each logical unit is associated with at least one interface and a group of network addresses. Each logical unit is configured to monitor a status of the at least one interface with which the each logical unit is associated, monitor a status of each network address in the group of network addresses with which the each logical unit is associated, and determine whether to enter an inoperable state based on the monitoring the at least one interface and the monitoring the group of network addresses.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of implementations consistent with the principles of the invention refers to the accompanying drawings. The same reference numbers in different drawings may identify the same or similar elements. Also, the following detailed description does not limit the invention. Instead, the scope of the invention is defined by the appended claims and their equivalents.

Systems and methods consistent with the principles of the invention improve traffic forwarding within a communications network. In an exemplary implementation, when a problem is detected in a logical portion of a network device, a corresponding logical portion of another network device may take over the functions performed by that problematic logical portion.

Exemplary System

Figure 1:
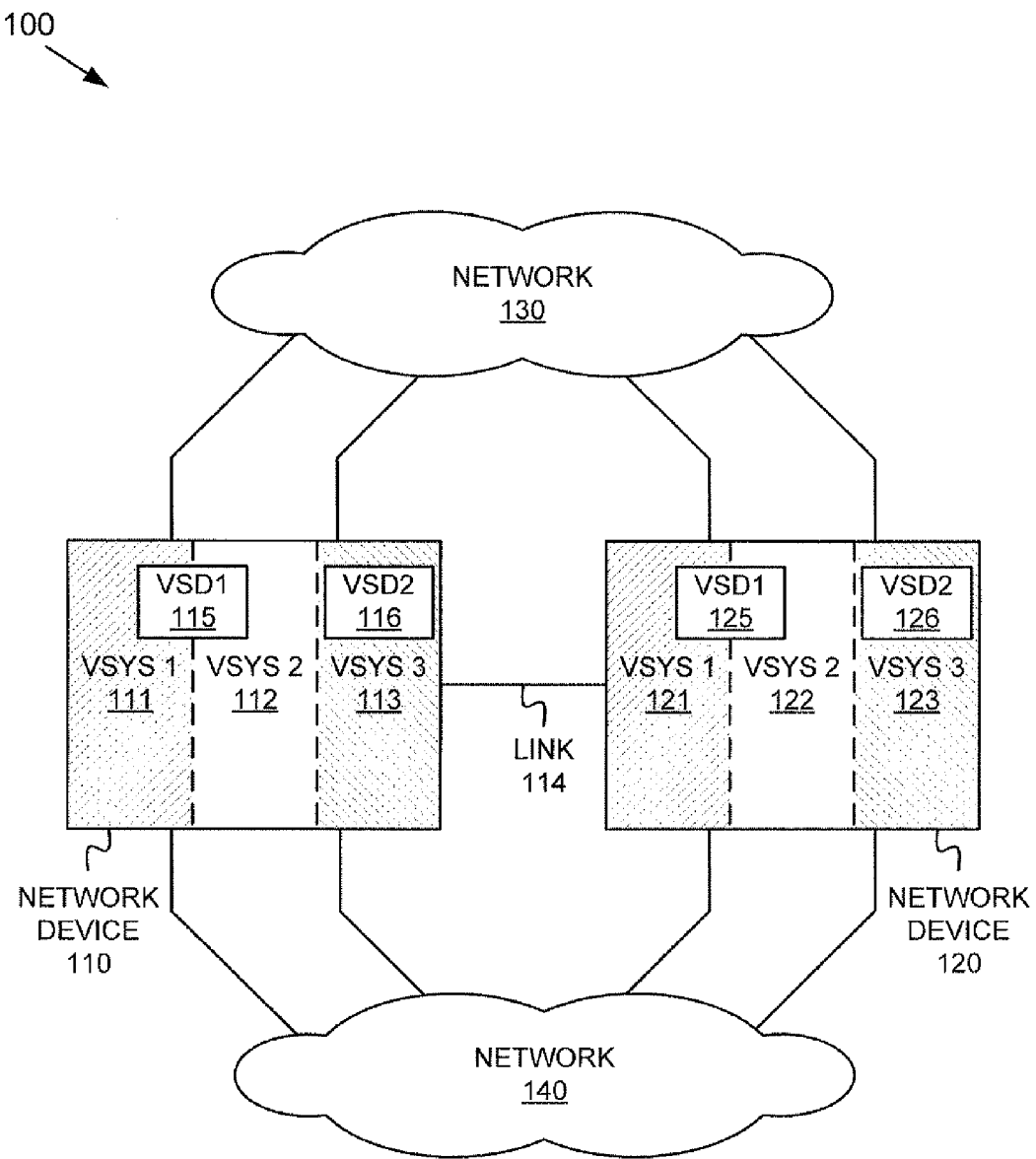
FIG. 1 is an exemplary diagram of a communications network in which systems and methods consistent with the principles of the invention may be implemented.

FIG. 1 is an exemplary diagram of a communications network 100 in which systems and methods consistent with the principles of the invention may be implemented. As illustrated, network 100 may include network devices 110 and 120 that route data between networks 130 and 140. It will be appreciated that network 100 may include other devices (not shown) that aid in receiving, processing, and/or transmitting data.

Network device 110 and 120 may include one or more network devices that receive data units (e.g., Internet Protocol (IP) packets) and forward the data units toward their destination(s). In some implementations, network devices 110 and 120 may perform one or more security functions, such as filtering the data units.

As illustrated in FIG. 1, network devices 110 and 120 may be divided into multiple virtual systems (VSYSs) 111-113 and 121-123, respectively. Each VSYS may be a subdivision of its network device and appear to a user to be a stand-alone entity. Each VSYS may be separately managed. In one implementation, VSYS 1 111 of network device 110 may be identical to VSYS 1 121 of network device 120, VSYS 2 112 of network device 110 may be identical to VSYS 2 122 of network device 120, and VSYS 3 113 of network device 110 may be identical to VSYS 3 123 of network device 120. In this way, one of VSYS 1 111 and 121 may serve as a backup for the other of VSYS 1 111 and 121, one of VSYS 2 112 and 122 may serve as a backup for the other of VSYS 2 112 and 122, and one of VSYS 3 113 and 123 may serve as a backup for the other of VSYS 3 113 and 123. It will be appreciated that each network device 110 and 120 may include more or fewer VSYSs than illustrated in FIG. 1.

In one implementation consistent with the principles of the invention, each network device 110 and 120 may include one or more virtual security devices (VSDs) 115, 116, 125, and 126. Each VSD 115/116/125/126 may be a single logical device within network device 110/120. In one implementation, VSD 1 115 of network device 110 may be identical to VSD 1 125 of network device 120 and VSD 2 116 of network device 110 may be identical to VSD 2 126 of network device 120. In this way, one of VSD 1 115 and 125 may serve as a backup for the other of VSD 1 115 and 125, and one of VSD 2 116 and 126 may serve as a backup for the other of VSD 2 116 and 126. It will be appreciated that each network device 110 and 120 may include more or fewer VSDs than illustrated in FIG. 1.

In one implementation consistent with the principles of the invention, each VSYS 111/112/113/121/122/123 may be associated with (or bound to) a VSD 115/116/125/126. Multiple VSYSs may bind to a single VSD or a single VSYS may bind to multiple VSDs. For explanatory purposes, it will be assumed hereafter that VSYS 1 111 and VSYS 2 112 bind to VSD 1 115 of network device 110, VSYS 3 113 binds to VSD 2 116 of network device 110, VSYS 1 121 and VSYS 2 122 bind to VSD 1 125 of network device 120, and VSYS 2 123 binds to VSD 2 126 of network device 120.

Network device 110 may connect to network device 120 via a link 114. In one implementation, link 114 may include a dedicated physical link. It will be appreciated that link 114 may be any type of link for communicating information, including a wireless link. Link 114 may allow network devices 110 and 120 to communicate with one another. For example, network devices 110 and 120 may transmit/receive status messages via link 114.

Networks 130 and 140 may include one or more networks capable of forwarding data units. Networks 130 and 140 may include, for example, a local area network (LAN), a wide area network (WAN), a telephone network, such as the Public Switched Telephone Network (PSTN), an intranet, the Internet, or a combination of networks. In one implementation, network 130 may include an untrusted network, such as the Internet, and network 140 may include a trusted network, such as a private network.

Figure 2:
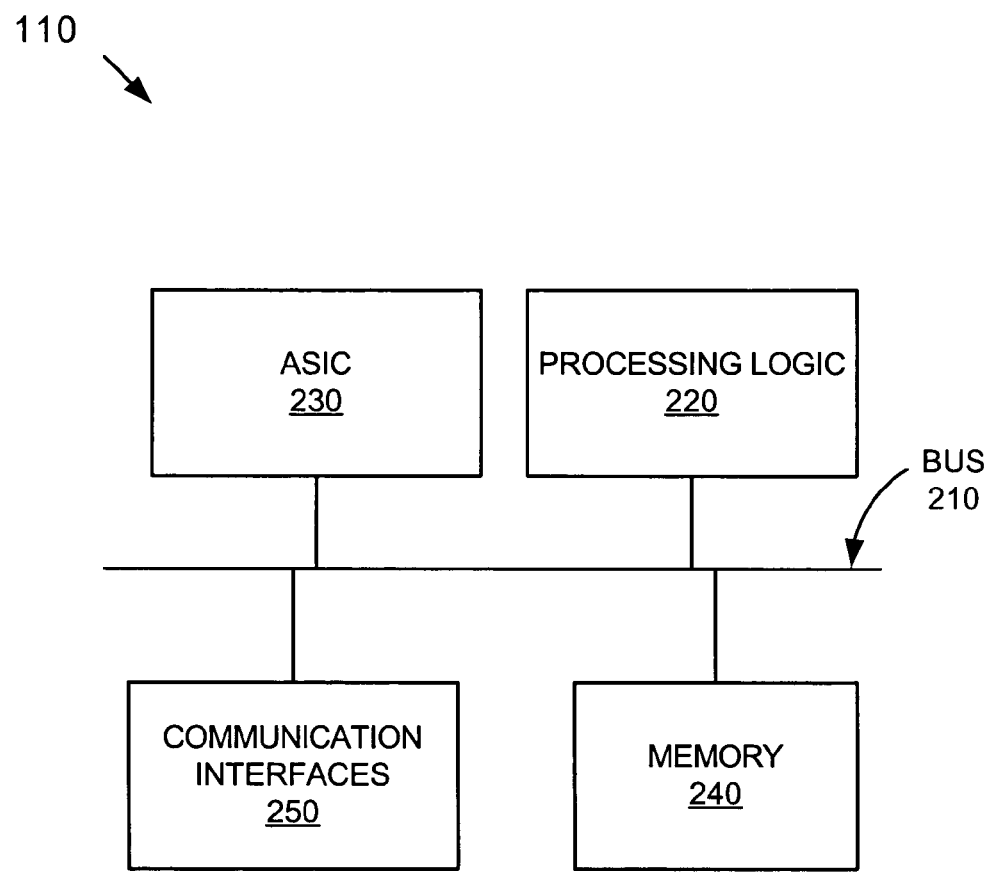
FIG. 2 is an exemplary configuration of the network device of FIG. 1 in an implementation consistent with the principles of the invention.

FIG. 2 is an exemplary configuration of network device 110 of FIG. 1 in an implementation consistent with the principles of the invention. It will be appreciated that network device 120 may be similarly configured. As illustrated, network device 110 may include a bus 210, processing logic 220, an Application Specific Integrated Circuit (ASIC) 230, a memory 240, and a group of communication interfaces 250. Bus 210 permits communication among the components of network device 110.

Processing logic 220 may include any type of conventional processor or microprocessor that interprets and executes instructions. ASIC 230 may include one or more ASICs capable of performing network-related functions. In one implementation, ASIC 230 may perform a security-related function.

Memory 240 may include a random access memory (RAM) or another dynamic storage device that stores information and instructions for execution by processing logic 220; a read only memory (ROM) or another type of static storage device that stores static information and instructions for use by processing logic 220; and/or some other type of magnetic or optical recording medium and its corresponding drive. Communication interfaces 250 may include any transceiver-like mechanism that enables network device 110 to communicate with other devices and/or systems, such as network device 120 and devices associated with networks 130 and 140.

As will be described in detail below, network device 110, consistent with the principles of the invention, may perform network communications-related operations. Network device 110 may perform these and other operations in response to processing logic 220 executing software instructions contained in a computer-readable medium, such as memory 240. A computer-readable medium may be defined as one or more memory devices and/or carrier waves. The software instructions may be read into memory 240 from another computer-readable medium or from another device via a communication interface 250. The software instructions contained in memory 240 may cause processing logic 220 to perform processes that will be described later. Alternatively, hardwired circuitry may be used in place of or in combination with software instructions to implement processes consistent with the principles of the invention. Thus, systems and methods consistent with the principles of the invention are not limited to any specific combination of hardware circuitry and software.

Figure 3:
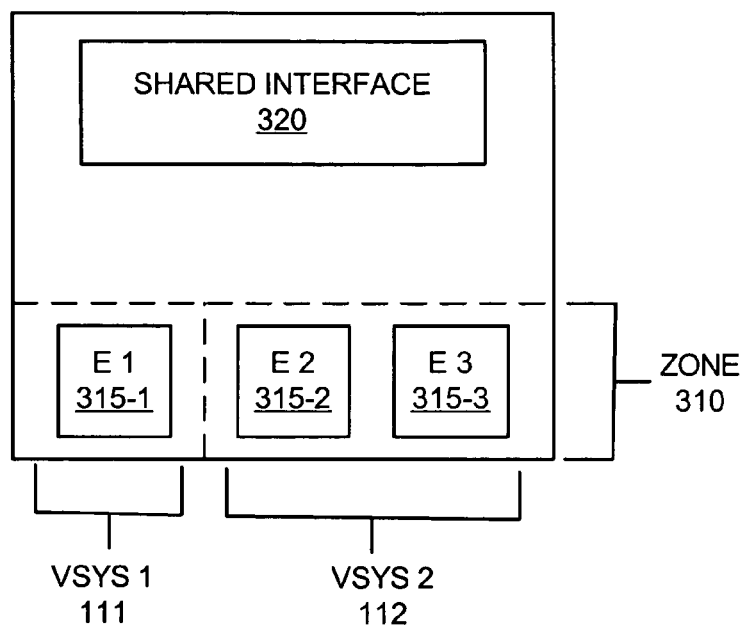
FIG. 3 is an exemplary configuration of a virtual security device (VSD) in an implementation consistent with the principles of the invention.

FIG. 3 is an exemplary configuration of VSD 1 115 in an implementation consistent with the principles of the invention. VSD 1 125 may be configured in a similar manner. VSDs 2 116/126 may be similarly configured. As illustrated, VSD 1 115 may include a zone 310 of interfaces E1-E3 315-1 through 315-3 (collectively, "interfaces 315") that share a common interface 320. Interfaces 315 may, for example, connect network device 110 to network 140, while shared interface 320 may connect network device 110 to network 130. As illustrated, interface E 1 315-1 may be associated with VSYS 1 111, while interfaces E 2 315-2 and E3 315-3 may be associated with VSYS 2 112.

Figure 4:
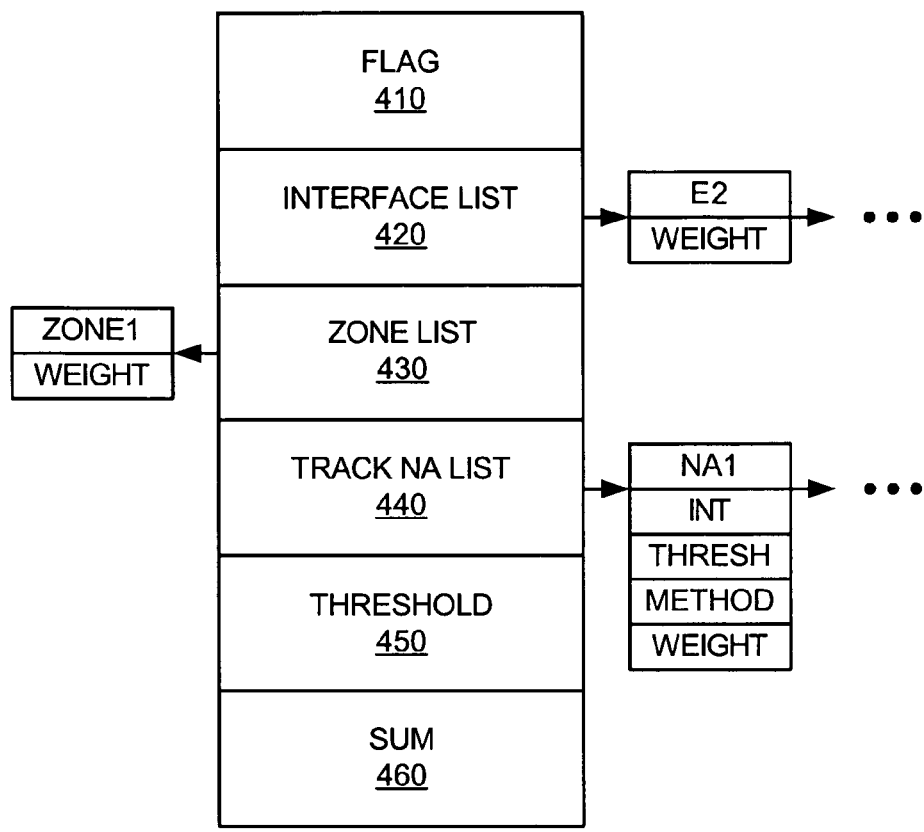
FIG. 4 is an exemplary configuration of a data structure that may be associated with a VSD in an implementation consistent with the principles of the invention.

FIG. 4 is an exemplary configuration of a data structure 400 that may be associated with a VSD in an implementation consistent with the principles of the invention. For explanatory purposes, assume that data structure 400 described below is associated with VSD 1 115 of FIG. 1. A similar data structure may be associated with VSD 1 125 and VSD 2 116/126.

As illustrated, data structure 400 may include a flag field 410, an interface list field 420, a zone list field 430, a track network address (NA) list field 440, a threshold field 450, and a summation (SUM) field 460. Flag field 410 may store a flag value. In one implementation, a flag value of 1 may indicate that the flag has been set and a flag value of 0 may indicate that the flag has not been set.

Interface list field 420 may store a list of zero or more interfaces to be monitored. In one implementation, interface list field 420 may store information identifying interfaces associated with VSD 1 115. In the exemplary configuration illustrated in FIGS. 1 and 3, VSD 1 115 may be associated with interfaces E1-E3 315 and shared interface 320. Therefore, interface list field 420 may store information identifying interfaces E1-E3 315 and shared interface 320. Each interface identified in interface list field 420 may be associated with a weight value. The weight values may be configurable.

Zone list field 430 may store a list of zones associated with VSD 1 115. In the exemplary configuration illustrated in FIG. 3, VSD 1 115 may be associated with zone 310. Therefore, zone list field 430 may store information identifying zone

310. Each zone identified in zone list field 430 may be associated with a weight value. The weight values may be configurable.

Track network address list field 440 may store a list of zero or more network addresses to be monitored. In one implementation, track network address list field 440 may store network addresses of which VSD 1 115 is associated. For example, VSD 1 115 may monitor the status of one or more devices associated with network 130 and/or 140. Therefore, the network address (e.g., an IP address) of those devices may be stored in field 440 for VSD 1 115. Each network address in track network address list field 310 may be associated with the following information: an interval value, a threshold value, method information, and a weight value. This information may be configurable. The interval value may indicate how often the associated network address is to be contacted. In one implementation, the interval value may be 1 second. The threshold value may indicate the number of times that the associated network address is to be contacted if no reply is received. In one implementation, the threshold value may be 3. The method information may indicate the manner in which the associated network address is to be contacted. For example, the method information may indicate that the associated network address is to be pinged. Other techniques for contacting network addresses may alternatively be used. For example, an address resolution protocol (ARP) technique may alternatively be used. The choice of method may be user configurable.

Threshold field 450 may store a configurable threshold value. The threshold value may be an integer value greater than or equal to 1. Summation field 460 may store a value representing a current status level of VSD 1 115. The manner in which the summation value is determined is described in detail below with respect to the process of FIG. 5.

Exemplary Processing

Figure 5:
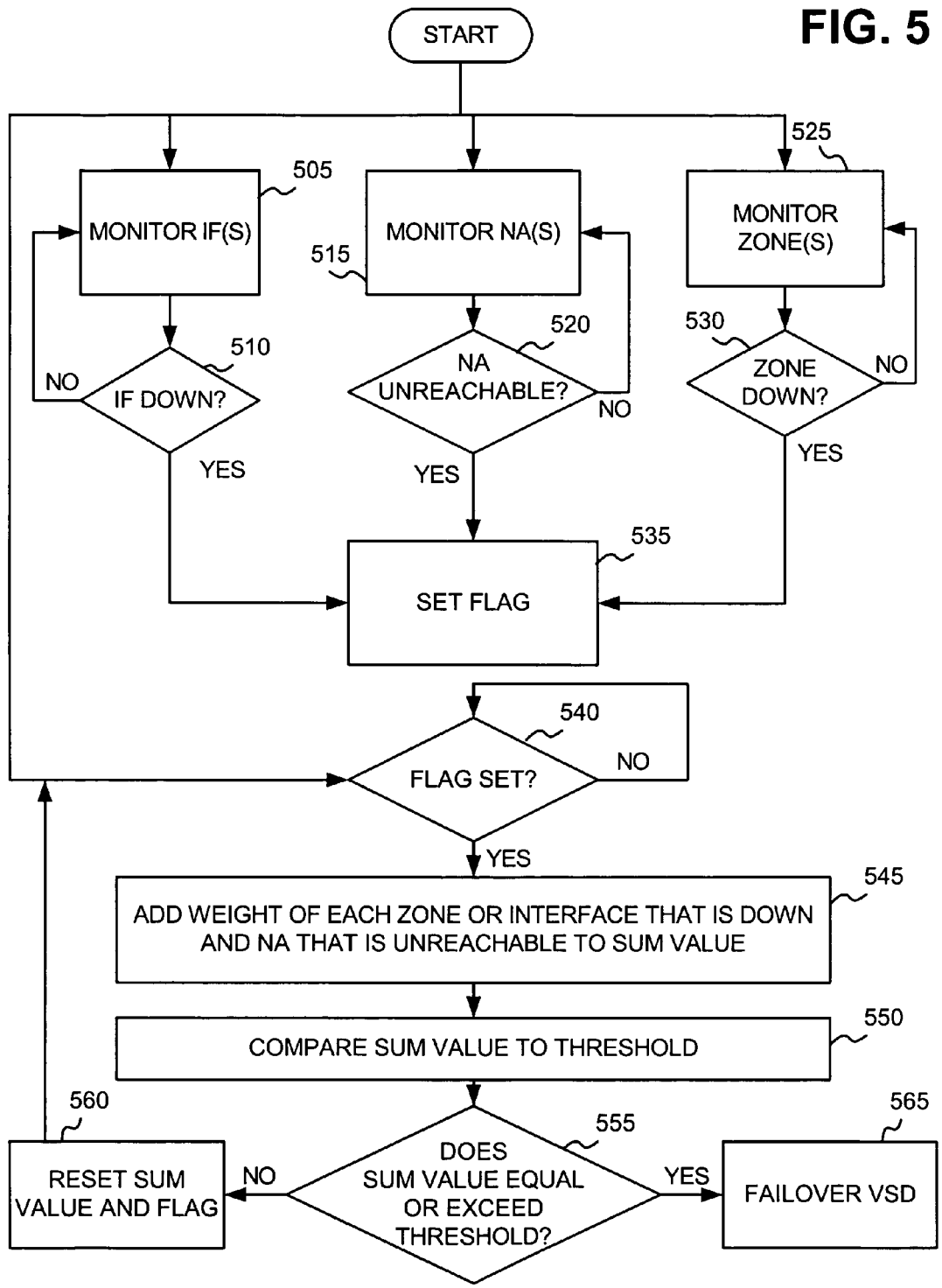
FIG. 5 is a flowchart of an exemplary process for routing data units in a network in an implementation consistent with the principles of the invention.

FIG. 5 is a flowchart of an exemplary process for routing data units in network 100 in an implementation consistent with the principles of the invention. The following process may be implemented by a VSD of a network device 110/120. It is assumed, for explanatory purposes, that the processing described below is performed by VSD 1 115 of network device 110.

Processing may begin with VSD 1 115 monitoring the status of the interfaces (IFs) (e.g., interfaces 315 and 320 in the exemplary configuration illustrated in FIG. 3) identified in interface list field 420 of data structure 400 (act 505). In one implementation, VSD 1 115 may receive event messages from each interface 315 and 320 identified in field 420 of data structure 400. VSD 1 115 may determine whether any of the associated interfaces are down (act 510). VSD 1 115 may determine that a particular associated interface 315/320 is down when an event message is received from that associated interface 315/320. If each of the associated interfaces is determined to be operable (i.e., not down), processing may return to act 505 with VSD 1 115 continuing to monitor the status of the associated interfaces. In one implementation, VSD 1 115 may verify the status of the associated interfaces at a periodic time interval, such as every second. The time interval may be configurable.

VSD 1 115 may monitor the status of the network addresses stored in field 440 of data structure 400 associated with VSD 1 115 (act 515). In one implementation, VSD 1 115 may contact each network address in track network address list field 440 at the interval and using the method specified in data structure 400. VSD 1 115 may determine whether any of the network addresses are unreachable (e.g., the device associated with the network address cannot be reached) (act 520). VSD 1 115 may determine that a particular network address is not reachable when the number of times that a reply to a ping request (or ARP command) to that network address has not been received equals the threshold value stored in data structure 400 for that network address. If each of the network addresses is determined to be reachable, processing may return to act 515 with VSD 1 115 continuing to verify the status of the network addresses at the intervals specified in data structure 400.

Similar to the monitoring of the interfaces and network addresses, VSD 1 115 may monitor the status of each zone identified in zone list 430 of data structure 400 associated with VSD 1 115 (act 525). In one implementation, VSD 1 115 may receive event messages from each zone identified in field 430 of data structure 400. VSD 1 115 may determine whether any of the associated zones are down (act 530). VSD 1 115 may determine that a particular zone is down when an event message is received from that associated zone indicating that the zone is down. If each zone in zone list 430 is determined to be operable (i.e., not down), processing may return to act 525 with VSD 1 115 continuing to monitor the status of the associated zones. In one implementation, VSD 1 115 may verify the status of the associated zones at a periodic time interval, such as every second. The time interval may be configurable.

If VSD 1 115 determines that one or more of the interfaces from interface list 420 are down (act 510), one or more network addresses from track network address list field 440 are unreachable (act 410), or one or more zones from zone list 430 are down (act 530), VSD 1 115 may set the flag in flag field 410 (act 535).

VSD 1 115 may periodically check the status of the flag in flag field 410 of data structure 400 (act 540). If VSD 1 115 determines that the flag in field 410 has not been set (act 540), processing can return to act 540 with VSD 1 115 continuing to check the status of the flag in field 410. If, on the other hand, VSD 1 115 determines that the flag in field 410 has been set (act 540), VSD 1 115 may add the weights of the associated interfaces or zones that are determined to be down and the weights of those network addresses that are determined to be unreachable to the summation value in summation field 460 (act 545). The summation value may be zero (or some other predetermined value) when all of the interfaces and zones are determined to be available and all of the network addresses are determined to be reachable.

VSD 1 115 may compare the summation value in summation field 460 to the threshold value in field 450 (act 550). VSD 1 115 may make this comparison at predetermined periods. If the summation value does not equal or exceed the threshold value (act 555), VSD 1 115 may reset the summation value to zero and reset the flag (e.g., set the flag value to zero) (act 560). Processing may then return to act 540 with VSD 1 115 determining whether the flag in flag field 410 has been set. If, on the other hand, the summation value equals or exceeds the threshold value (act 555), VSD 1 115 becomes inoperable and should be failed over to VSD 1 125 of network device 120 (act 565).

Figure 6:
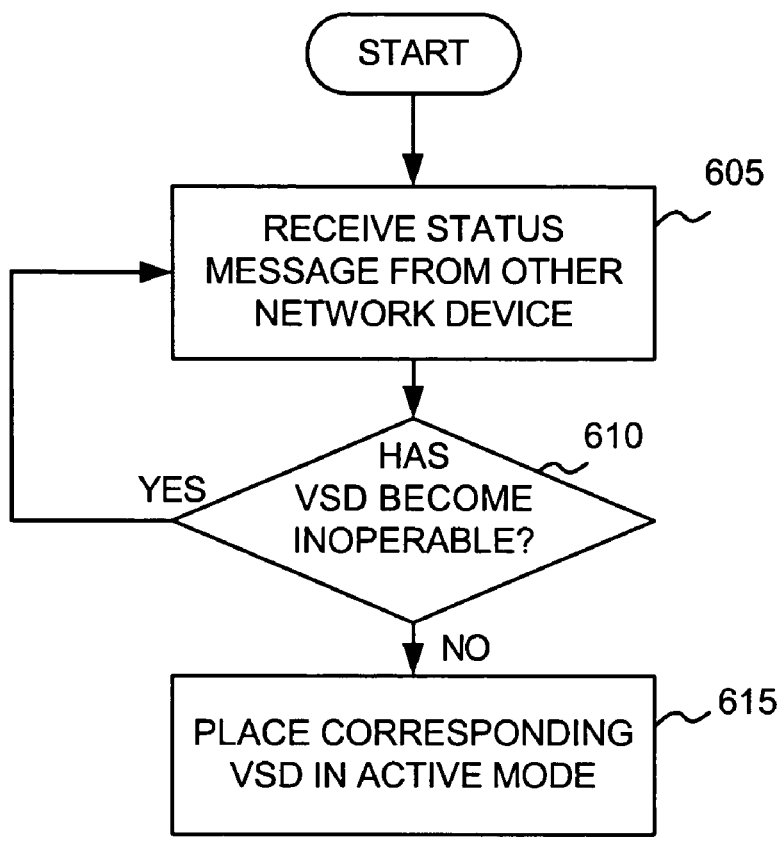
FIG. 6 is a flowchart of an exemplary process for failing over a logical portion of a network device in an implementation consistent with the principles of the invention.

FIG. 6 is a flowchart of an exemplary process for failing over a logical portion of a network device 110/120 in an implementation consistent with the principles of the invention. Processing may begin with network device 120 monitoring status messages received from network device 110 (act 605). Network devices 110 and 120 may periodically exchange status messages via link 115. The status messages may indicate the operability of each VSD associated with the network device. For example, network device 110 may transmit a status message to network device 120 indicating the status of VSD 1 115 and VSD 2 116. Similarly, network device 120 may transmit a status message to network device 110 indicating the status of VSD 1 125 and VSD 2 126. Each network device 110/120 may transmit status messages at configurable time intervals (e.g., every second) or in response to an event (e.g., a logical section of network device 110/120 becoming inoperable).

It is assumed for explanatory purposes that VSD 1 115 of network device 110 is active and that VSD 2 125 of network device 120 is inactive (e.g., serving as the backup for VSD 1 115). It is also assumed that VSD 1 115 of network device 110 becomes inoperable. As such, network device 110 may transmit a status message to network device 120 that indicates that VSD 1 115 has become inoperable (act 610). In response, network device 120 may place VSD 1 125, which corresponds to VSD 1 115, into an active mode, thereby failing over VSD 1 from network device 110 to network device 120 (act 615). Since VSD 1 115 is failed over, each VSYS associated with VSD 1 115 of network device 110 will also be failed over to network device 120. Therefore, any sessions associated with VSD 1 115 will be transferred to network device 120 for processing by the appropriate VSYS associated with VSD 2 125.

Once a VSD is failed over, the VSD may continue to verify the status of the network addresses with which the VSD is associated. For example, the VSD may continue to send ping (or ARP) commands to the network addresses associated with the VSD and then re-compute the summation value to determine whether the VSD should be brought back up. When a VSD is brought back up, the VSD may, for example, serve as the backup for the currently active VSD or this newly recovered VSD may resume functioning as the active VSD and the currently active VSD may return to an inactive (or backup) state.

The following example illustrates the above processing. With reference to FIG. 1, assume for this example that VSD 1 115 of network device 110 is operable and is in an active mode and that VSD 1 125 of network device 120 is in a backup mode. Assume further that VSD 1 115 is configured as illustrated in FIG. 3. Moreover, assume that VSD 1 115 is associated with exemplary data structure 700 illustrated in FIG. 7.

Figure 7:
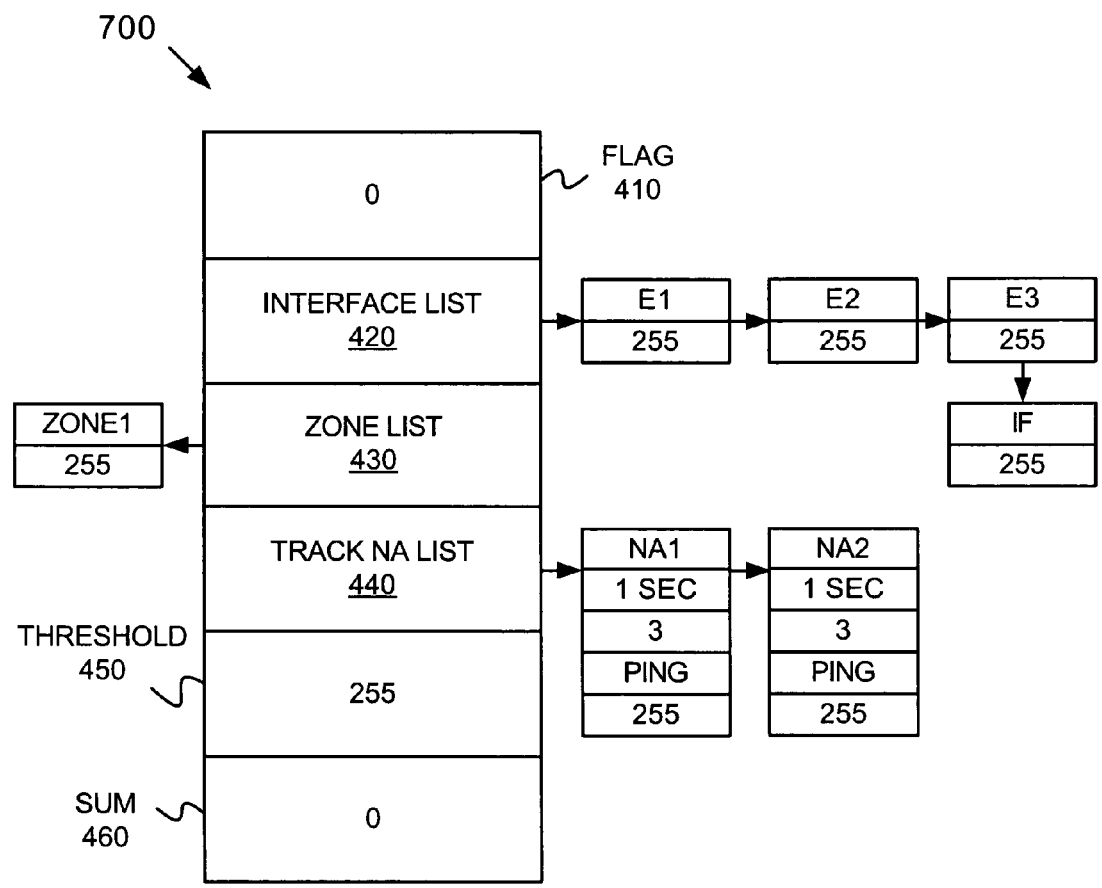
FIG. 7 is an exemplary data structure that may be associated with a VSD in an implementation consistent with the principles of the invention.

With reference to FIG. 7, assume that the flag value in flag field 410 is zero (meaning that the flag is not set), that interface list field 420 stores information identifying interfaces E 1, E 2, and E 3 315 and shared interface (IF) 320, each having a weight assigned to it of 255, that zone list field 430 stores information identifying zone 310, which has a weight assigned to it of 255, that track network address field 440 stores the two network addresses (i.e., NA1 and NA2), each having a weight assigned to it of 255, that the threshold value in threshold field 450 is 255, and the summation value in summation field 460 is 0.

Processing may begin with VSD 1 115 monitoring the status of interfaces 315 and 320 listed in interface list 420, zones 310 listed in zone list 430, and network addresses listed in track network address list field 440. As illustrated in FIG. 7, VSD 1 115 may cause the status of network address NA1 to be checked every second via a pinging method.

Assume for this example that a response is not received from NA1 in response to three consecutive ping requests (the threshold value for network address NA1). The flag in flag field 410 may then be set (e.g., by making the flag value 1). VSD 1 115 may periodically check the status of the flag in flag field 410. Upon detecting that the flag is set, VSD 1 115 may add the weight (255) associated with network address NA1 to the summation value (0) in summation field 460. The new summation value (255) may then be compared to the threshold value (255) in threshold field 450. Since the new summation value (255) matches the threshold value (255), VSD 1 115 becomes inoperable.

In a status message from network device 110 to network device 120, network device 110 may indicate that VSD 1 115 has become inoperable. Upon receipt, network device 120 may activate VSD 1 125. In this way, a logical portion of network device 110 can be failed over to network device 120. Other portions of network device 110 may continue operating as usual. For example, if VSD 2 116 of network device was in an active mode prior to VSD 1 115 being failed over to network device 120, VSD 2 116 may continue processing traffic during and after the fail over of VSD 1 115. By only failing over a logical portion of network device, the time period in which a fail over can occur is reduced.

CONCLUSION

Systems and methods consistent with the principles of the invention improve traffic forwarding within a communications network. In an exemplary implementation, if a logical portion of a first network device becomes inoperable, that logical portion of the first network device can be failed over to a second network device while the remaining operable portions of the first network device can continue functioning as usual.

The foregoing description of exemplary implementations consistent with the principles of the invention provides illustration and description, but is not intended to be exhaustive or to limit the invention to the precise form disclosed. Modifications and variations are possible in light of the above teachings or may be acquired from practice of the invention. For example, while a series of acts has been described with regard to FIGS. 5 and 6, the order of the acts may be varied in other implementations consistent with the invention. Moreover, non-dependent acts may be implemented in parallel.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A method performed by a computer comprising:
   detecting, by a virtual security device, a problem with a logical section of a first network device, the logical section including at least one interface and being associated with a group of network addresses, where each network address in the group of network addresses and each interface of the at least one interface are associated with a weight, where the detecting includes:
   identifying, by the virtual security device, whether the at least one interface is down,
      identifying, by the virtual security device, those network addresses in the group of network addresses with which the logical section is associated that are unreachable,
      accumulating, by the virtual security device, the weights associated with those network addresses that are determined to be unreachable and those interfaces of the at least one interface that are determined to be down to obtain an accumulated value, and
      comparing, by the virtual security device, the accumulated value to a threshold;

and failing over only the logical section of the first network device to a second network device when the accumulated value equals or exceeds the threshold.

2. The method of claim 1, where the identifying those network addresses in the group of network addresses that are unreachable includes:
pinging each network address, and
determining that the each network address is unreachable when a reply is not received after a number of pings.

3. The method of claim 1, where the failing over includes:
transmitting, via the first network device, a message to the second network device, the message identifying the logical section.

4. The method of claim 1, where the failing over includes:
moving at least one communication session associated with the logical section to the second network device.

5. A network device comprising:
means for detecting that a logical portion of a network device is malfunctioning, the logical portion including at least one interface and being associated with a group of network addresses, where each network address in the group of network addresses and each interface of the at least one interface are associated with a weight, where the means for detecting includes:
means for identifying whether the at least one interface is down, and
means for identifying those network addresses in the group of network addresses with which the logical portion is associated that are unreachable,
means for accumulating the weights associated with those network addresses that are determined to be unreachable and those interfaces of the at least one interface that are determined to be down to obtain an accumulated value, and
means for comparing the accumulated value to a threshold; and
means for causing the logical portion to be failed over to a different network device when the accumulated value equals or exceeds the threshold.

6. A system comprising:
a first network device including a plurality of first logical portions and being to:
detect a problem with one first logical portion of the plurality of first logical portions, and
transmit a message identifying the one first logical portion,
the first network device further including a memory to store a data structure for each first logical portion of the plurality of first logical portions, each data structure including:
a list of interfaces within the first network device that are associated with the first logical portion, each interface in the list of interfaces being associated with a weight,
a list of network addresses, each network address in the group of network addresses being associated with the first logical portion and being associated with a weight,
a threshold value, and
a summation value; and
a second network device including a plurality of second logical portions, the plurality of second logical portions corresponding to the plurality of first logical portions, the second network device being to:
receive the message from the first network device, and
activate the one second logical portion corresponding to the one first logical portion in response to receiving the message.

7. The system of claim 6, where each network address in the list of network address is further associated with information identifying a manner in which the network address is to be contacted, information identifying an interval at which the network address is to be contacted, and information identifying how many times the network address should be contacted when no reply is received.

8. The system of claim 6, where, when detecting a problem with the one first logical portion, the first network device is to:
track a status of each network address in the list of network addresses, and
monitor a status of each interface in the list of interfaces.

9. The system of claim 8, where, when detecting a problem with the one first logical portion, the first network device is to:
identify, based on the tracking, a network address that cannot be reached,
add the weight associated with the network address to the summation value to form a new summation value,
compare the new summation value to the threshold value, and
determine whether a problem exists with the one first logical portion based on the comparison of the new summation value to the threshold value.

10. The system of claim 8, where, when detecting a problem with the one first logical portion, the first network device is to:
identify, based on the monitoring, an interface in the list of interfaces that is down,
add the weight associated with the identified interface to the summation value to form a new summation value,
compare the new summation value to the threshold value, and
determine whether a problem exists with the one first logical portion based on the comparison of the new summation value to the threshold value.

11. The system of claim 6, where the weights associated with the list of network addresses and the weights associated with the list of interfaces are configurable.

12. The system of claim 6 further comprising:
a dedicated link connecting the first network device and the second network device, and
where, when transmitting the message, the first network device is to:
transmit the message over the dedicated link.

13. The system of claim 6, where at least one other first logical portion of the plurality of first logical portions continues to operate on the first network device after transmitting the message.

14. A network device comprising:
a plurality of logical units, each logical unit of the plurality of logical units being associated with at least one interface and a group of network addresses, each logical unit of the plurality of logical units being to:
monitor a status of the at least one interface with which the each logical unit is associated,
monitor a status of each network address in the group of network addresses with which the each logical unit is associated, and
determine whether to enter an inoperable state based on the monitoring the at least one interface and the monitoring the group of network addresses; and
a group of data structures, each data structure in the group of data structures being associated with one of the logical units in the plurality of logical units and including:

information identifying the at least one interface, each interface of the at least one interface being associated with a weight, information identifying the group of network addresses, each network address in the group of network addresses being associated with a weight, a threshold value, and a summation value.

15. The network device of claim 14, where, when monitoring a status of the at least one interface, the each logical unit is to:

receive event messages from the at least one interface.

16. The network device of claim 14, where, when monitoring a status of each network address in the group of network addresses, the each logical unit is to:

ping each network address to determine if the each network address is reachable.

17. The network device of claim 14, where each logical unit of the plurality of logical units is to:

identify, based on the monitoring the at least one interface, an interface in the at least one interface that is down, add the weight associated with the identified interface to the summation value to form a new summation value, compare the new summation value to the threshold value, and determine whether to enter an inoperable state based on the comparison of the new summation value to the threshold value.

18. The network device of claim 14, where each logical unit of the plurality of logical units is to:

identify, based on the monitoring the group of network addresses, a network address that cannot be reached, add the weight associated with the network address to the summation value to form a new summation value, compare the new summation value to the threshold value, and determine whether to enter an inoperable state based on the comparison of the new summation value to the threshold value.

19. The network device of claim 16, where each logical unit of the plurality of logical units is further to:

cause a message to be transmitted to another network device when the each logical unit determines to enter an inoperable state.

20. The network device of claim 19, where the message is transmitted to the other network device via a dedicated link.

21. A method performed by a network device including a plurality of logical units, the method comprising:

monitoring at least one of an interface with which one logical unit of the plurality of logical units is associated or a group of network addresses with which the one logical unit is associated, each interface of the at least one interface being associated with a weight and each network address in the group of network addresses being associated with a weight, where the monitoring includes:

identifying whether the interface is down, identifying those network addresses in the group of network addresses that are unreachable, accumulating the weights associated with those network addresses that are determined to be unreachable and those interfaces of the at least one interface that are determined to be down to obtain an accumulated value, and comparing the accumulated value to a threshold; and failing over the one logical unit to another network device based on the monitoring at least one of the interface or the group of network addresses.

22. The method of claim 21, where the weights associated with the group of network addresses and the weights associated with the at least one interface are configurable.

23. The method of claim 21, where the monitoring a group of network addresses with which the one logical unit is associated is performed at time intervals.

24. The method of claim 23, where the time intervals are configurable.

25. The method of claim 1, further comprising:

after failing over only the logical section of the first network device, continuing operation of other logical sections of the first network device.

26. The method of claim 1, where failing over only the logical section of the first network device comprises not failing over any other logical section of the first network device.

* * * * *